(12) United States Patent
Loesch et al.

(10) Patent No.: US 11,500,061 B2
(45) Date of Patent: Nov. 15, 2022

(54) METHOD FOR THE PHASE CALIBRATION OF HIGH-FREQUENCY COMPONENTS OF A RADAR SENSOR

(71) Applicant: Robert Bosch GmbH, Stuttgart (DE)

(72) Inventors: Benedikt Loesch, Stuttgart (DE); Klaus Baur, Mietingen (DE); Marcel Mayer, Lonsee (DE); Michael Schoor, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 279 days.

(21) Appl. No.: 16/772,147

(22) PCT Filed: Mar. 7, 2019

(86) PCT No.: PCT/EP2019/055707
§ 371 (c)(1),
(2) Date: Jun. 11, 2020

(87) PCT Pub. No.: WO2019/219263
PCT Pub. Date: Nov. 21, 2019

(65) Prior Publication Data
US 2021/0072350 A1 Mar. 11, 2021

(30) Foreign Application Priority Data
May 17, 2018 (DE) .......................... 102018207718.5

(51) Int. Cl.
*G01S 7/40* (2006.01)
*G01S 7/35* (2006.01)

(52) U.S. Cl.
CPC ............... *G01S 7/40* (2013.01); *G01S 7/352* (2013.01); *G01S 7/4008* (2013.01); *G01S 7/4017* (2013.01); *G01S 7/4021* (2013.01)

(58) Field of Classification Search
None
See application file for complete search history.

(56) References Cited

U.S. PATENT DOCUMENTS

2012/0293362 A1 11/2012 Liang et al.
2017/0045609 A1* 2/2017 Loesch ............... H01Q 1/3233

FOREIGN PATENT DOCUMENTS

DE 102014208899 A1 11/2015
DE 102015222884 A1 5/2017
(Continued)

OTHER PUBLICATIONS

JP2009281775 translation (Year: 2009).*
International Search Report for PCT/EP2019/055707, dated May 31, 2019.

*Primary Examiner* — Whitney Moore
(74) *Attorney, Agent, or Firm* — Norton Rose Fulbright US LLP; Gerard Messina

(57) ABSTRACT

A method for calibrating two receiving units of a radar sensor that includes an array of receiving antennas formed by two sub-arrays and an evaluation unit, which is designed to carry out an angle estimation for located radar targets based on phase differences between the signals received by the receiving antennas, each receiving unit including parallel reception paths for the signals of the receiving antennas of one of the sub-arrays. The method includes: analyzing the received signals and deciding whether a multi-target scenario or a single-target scenario is present, in the case of a single-target scenario, measuring phases of the signals received in the sub-arrays and calculating a phase offset between the two sub-arrays, and calibrating the phases in the two receiving units based on the calculated offset.

17 Claims, 4 Drawing Sheets

(56) References Cited

FOREIGN PATENT DOCUMENTS

| | | | |
|---|---|---|---|
| JP | 2009281775 | A | 12/2009 |
| JP | 2016148638 | A | 8/2016 |
| WO | 2016067321 | A1 | 5/2016 |

\* cited by examiner

METHOD FOR THE PHASE CALIBRATION OF HIGH-FREQUENCY COMPONENTS OF A RADAR SENSOR

The present invention relates to a method for the phase calibration of two high-frequency components of a radar sensor, which includes an array of receiving antennas formed by two sub-arrays and an evaluation unit, which is designed to carry out an angle estimation for located radar targets based on phase differences between the signals received by the receiving antennas, each high-frequency component including parallel receiving paths for the signals of the receiving antennas of one of the sub-arrays.

BACKGROUND INFORMATION

Efficient radar sensors that are capable of measuring distances, relative speeds and direction angles (in particular, in the azimuth) of other road users, in particular of other vehicles with a high degree of accuracy and reliability are required in driver assistance systems for motor vehicles and, in particular, in vehicle guidance systems for autonomous driving.

Many conventional radar sensors for motor vehicles operate according to the FMCW (frequency modulated continuous wave) principle, in which the frequency of the transmitted radar signal is ramp-shaped modulated and the received radar echo is mixed with a portion of the signal transmitted at the instantaneous point in time. In this way, an intermediate frequency signal is obtained, whose frequency corresponds to the frequency difference between the transmitted and the received signal. This frequency difference includes a distance-dependent portion due to the propagation time of the radar signal and due to the frequency modulation, which is proportional to the ramp slope. Due to the Doppler effect, the frequency difference also includes a proportion, which is a function of the relative speed of the located object. By comparing measured results that have been obtained with different ramp slopes, it is possible to separate the two portions from one another so that distance d and relative speed v of a located object may be determined.

In some conventional FMCW radar sensors, a single measuring cycle includes a multitude of "rapid" frequency ramps (rapid chirps) having a high slope, whose center frequencies in turn are modulated on a "slow" ramp. With a two-dimensional Fourier transform of the intermediate frequency signal, on the one hand via the rapid ramps and on the other hand via the slow ramps, it is then possible to achieve a higher measuring accuracy in the distance and relative speed measurement.

An estimation of the direction angles of the located radar targets is enabled by offsetting the receiving antennas from one another within the array in the direction in which the angle is to be measured, typically in the horizontal direction. The signals received by the individual receiving antennas then include a phase difference, which is a function of the angle of incidence of the radar echo. The angular resolution may be improved by increasing the aperture of the array and the number of receiving antennas. However, this also increases the number of receiving channels, so that the complexity of the receiving part of the high-frequency component increases significantly.

The aperture of the array may also be enlarged without increasing the number of receiving antennas. In that case, however ambiguities may result when evaluating the phase differences, so that it is not possible to reliably determine the actual direction angle of the object. In a MIMO (multiple input multiple output) radar, the transmitting unit of the high-frequency component includes multiple transmitting antennas, which are also offset from one another in the horizontal. By operating the offset transmitting antennas, for example, in time division multiplexing or code multiplexing, the aperture of the array is then virtually enlarged without having to increase the number of receiving channels.

The present invention focuses, in particular, on radar sensors, which include two or more essentially identically-constructed high-frequency components. On the one hand, these components may be used individually in radar sensors having low power requirements, for example, in driver assistance systems and, on the other hand may be connected together to form multiple components in order to create a radar sensor having higher power, in particular, having higher angle separability. In the latter case, however, it is necessary to precisely synchronize the different high-frequency components with one another in order to avoid errors due to phase differences in the receiving parts and/or the transmitting parts of the different high-frequency components.

In general, any active electronic component of any high-frequency component may contribute to such phase differences. Since the received signals in the different receiving paths are processed separately, phase differences may also occur between the different receiving paths within the same high-frequency component. It is possible and customary to calibrate the radar sensor in the factory in such a way that the phase differences are largely eliminated. If, however, the operating conditions change during the operation of the radar sensor, the calibration may then be lost as a result.

This problem arises, in particular, in radar sensors that include multiple high-frequency components, which must necessarily be situated at certain spatial distances from one another and may therefore have different temperatures due to the generation of heat in the radar sensor. For this reason, temperature changes during the operation of the radar sensor may result in phase differences due to the temperature response of the electronic components involved, which adversely affect the accuracy of the calibration.

SUMMARY

An object of the present invention is to provide a method, which allows the multiple high-frequency components of a radar sensor to be recalibrated "online,", i.e., during ongoing operation of the radar sensor.

This object may be achieved according to example embodiments of the present invention.

The present invention includes, on the one hand, a method for calibrating two receiving units of a radar sensor, which includes an array of receiving antennas formed by two sub-arrays and an evaluation unit, which is designed to carry out an angle estimation for located radar targets based on phase differences between the signals received by the receiving antennas, each receiving unit including parallel reception paths for the signals of the receiving antennas of one of the sub-arrays, characterized by the following steps:
  analyzing the received signals and deciding whether a multi-target scenario or a single-target scenario is present,
  in the case of a single-target scenario, measuring phases of the signals received in the sub-arrays and calculating a phase offset between the two sub-arrays, and
  calibrating the phases in the two receiving units based on the calculated phase offset.

In accordance with the present invention, the phase differences between signals from receiving antennas belonging to the same sub-array are compared with corresponding phase differences for receiving antennas belonging to different sub-arrays. When calibrating correctly, the phase differences should be a function only of the locating angle of the located object and of the relative positions of the relevant receiving antennas, but not to which sub-array the receiving antennas belong. Significant phase differences from sub-array to sub-array therefore indicate a calibration error, which may be identified and corrected in this way.

One problem is that phase differences in a multi-target scenario become so blurred that any clear phase offset between the two sub-arrays is no longer determinable. A multi-target scenario is understood here to specifically mean a situation in which two targets are located simultaneously and the relationship of the distances and relative speeds of these two targets to one another is such that they result in an intermediate frequency signal at virtually the same frequency. A single-target scenario on the other hand is understood to mean a situation in which only a single object is located or, if two or more objects are located, their frequencies in the intermediate frequency signal so clearly differ from one another that they form two peaks clearly separated and distinguishable from one another in the spectrum of the intermediate frequency signal.

Certain conventional methods are available with which a single-target scenario may be distinguished from a—in practice significantly rarer occurring—multi-target scenario, for example, by analyzing the spectrum of the intermediate frequency signal and/or preferably by assessing the quality of an angle estimation function, which is calculated from the measured phase differences and for each possible locating angle of the object, indicates the probability that the object is located at the relevant angle. In the case of high quality, the angle estimation function has a sharp peak at a particular angle, which then represents the locating angle of the object. In a multi-target scenario, however, the peak is generally "smeared" over a significantly greater width, so that the exact locating angle may be less reliably determined.

According to the present invention, a distinction is made between a single-target scenario and a multi-target scenario based on such effects, and a recalibration takes place only in the case of a single-target scenario, in which the phase offset between the two sub-arrays is clearly establishable. To determine this phase offset, the received signals from the two sub-arrays are then compared with one another. In general, the dependency of the phase difference on the antenna distance for different pairings of receiving antennas is investigated in this case. If the calibration is correct, the same distance dependency should be obtained for antennas from different sub-arrays as in the case of antennas from the same sub-array. An erroneous calibration of the two receiving units is then apparent from the fact that, for antennas from different sub-arrays, there is, in addition to the phase difference to be expected due to the distance, invariably an approximately equally large phase offset. By statistically evaluating the phase differences for different pairs of receiving antennas, it is possible to smooth statistical fluctuations so that a meaningful measure for the phase offset to be corrected is obtained.

The present invention also includes a method for the phase calibration of two transmitting units of a radar sensor, which includes a real array of receiving antennas and an evaluation unit, which is designed to carry out an angle estimation for located radar targets based on phase differences between the signals received from the receiving antennas, each transmitting unit feeding at least one transmitting antenna and the transmitting antennas belonging to different transmitting units being offset from one another in the direction of the array in such a way that when both transmitting units are used, the real array is expanded by a virtual array. In one example embodiment, the method includes the following steps:

analyzing the received signals and deciding whether a multi-target scenario or a single-target scenario is present, in the case of a single-target scenario, measuring phases of the received signals and calculating a phase offset between the real array and the virtual array, and calibrating the phases in the two transmitting units based on the calculated phase offset.

This method is based on the same basic concept, differing only in that not two sub-arrays of the same real array are considered, but instead the (complete) real array and an associated virtual array, which is formed as a result of the receiving antennas of the real array, receive signals from another transmitting antenna, so that different signal paths and thus different phase shifts result due to the changed spatial offset between the receiving antennas and the transmitting antenna. Here, too, it is the case that the phase differences in the case of a correct calibration would have to be unrelated to whether two antennas from the same (real or virtual) array or two antennas from different arrays are considered. A significant phase offset therefore indicates an error in the phase calibration of the transmitting units involved.

Advantageous embodiments and refinements of the present invention are described herein.

The statistical noise in the measurement of the phase offset may be reduced by incorporating into the statistical evaluation the measured results obtained for a multitude of consecutive frequency ramps (for example, rapid chirps) of the transmit signal. The median value or also the average value of the phase offsets on the different frequency ramps may be considered, for example.

Depending on the accuracy required, the recalibration may take place in each measuring cycle or only at certain time intervals. In addition, the result of the phase calibration may, depending on efficiency and utilized capacity of the hardware, be used already in the instantaneous measuring cycle for an exact angle estimation or initially only stored and then used in the next measuring cycle or in multiple consecutive measuring cycles.

The method may be used analogously also in radar sensors that include three or more receiving units or transmitting units.

BRIEF DESCRIPTION OF THE DRAWINGS

Exemplary embodiments are explained below with reference to the figures.

DETAILED DESCRIPTION OF EXAMPLE EMBODIMENTS

Figure 1:
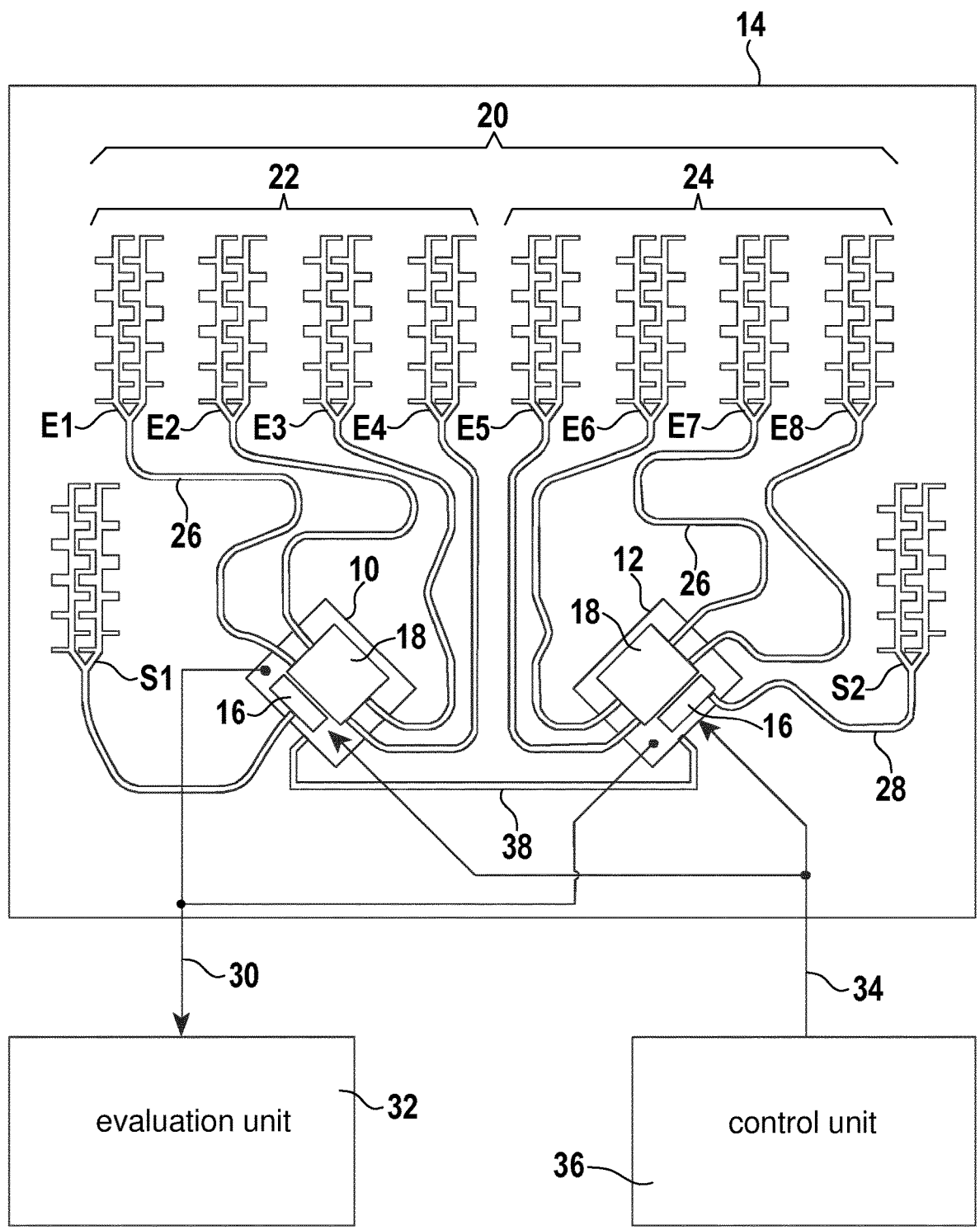
FIG. 1 shows a diagram of a radar sensor, in which the present invention is applicable.

FIG. 1 schematically shows a radar sensor for motor vehicles, which includes two high-frequency components 10, 12 on a shared circuit board 14. High-frequency components 10, 12 are formed, for example, by MMICs (monolithic microwave integrated circuits) and each includes a transmitting unit 16 and a receiving unit 18. Circuit board 14 includes an array 20 of receiving antennas E1 through E8, which are situated at equally spaced intervals on a horizontal. Array 20 is subdivided into two sub-arrays 22, 24, each sub-array including four receiving antennas. Each of the receiving antennas is formed by two parallel, vertically extending columns of antenna patches, via which a certain bundling of the receiving lobe in elevation is achieved. Receiving antennas E1 through E4 of sub-array 22 are connected via respective strip conductors 26 to receiving unit 18 of high-frequency component 10. Accordingly, receiving antennas E5 through E8 of sub-array 24 are connected to receiving unit 18 of high-frequency component 12. The lengths of strip conductors 26 are calibrated in such a way that they differ at most by integer multiples of the wavelength $\lambda$ of the microwaves, so that the phase relations between the signals received by the different receiving antennas are not distorted on the path to receiving units 18.

Transmitting units 16 of the two high-frequency components 10, 12 are each connected by strip conductors 28 to a transmitting antenna S1 and S2. Transmitting antennas S1 and S2 are also each formed by two vertical columns of antenna patches and are situated symmetrically to array 20, but offset vertically from this array on circuit board 14. Strip conductors 28 are also situated in such a way that the signal paths from transmitting unit 16 to the associated transmitting antenna differ at most by one integer multiple of $\lambda$.

Receiving unit 18 of each high-frequency component 10 includes four parallel reception paths, each of which processes the signal of one receiving antenna. As is known per se, each reception path includes a mixer, via which the received signal is mixed with a portion of the transmit signal, which is fed to the associated transmitting antenna, so that one intermediate frequency is formed per reception path. The intermediate frequency signals of the two receiving units 18 are fed via signal lines 30 to an evaluation unit 32, in which the signals are further evaluated, in order to determine relative speeds v and azimuth angle $\theta$ of the located radar targets.

Each high-frequency component 10 is also connected via control lines 34 to a control unit 36, which controls and coordinates the operation of the two high-frequency components 10, 12.

As customary, the transmit signal generated by transmitting unit 16 is ramp-shaped modulated in its frequency. The two transmitting units 16 are operated, for example, in time division multiplexing, so that in each case only one of the two transmitting antennas S1, S2 is active.

The intermediate frequency signals supplied by receiving units 18 are digitized in evaluation unit 32 or optionally already also in high-frequency components 10, 12 and recorded over the duration of a frequency ramp. Based on the (total of eight) time signals thus obtained, a respective spectrum is formed in evaluation unit 32 via rapid Fourier transform, in which each located object emerges as a peak at a particular frequency as a function of the distance and of the relative speed of the object. The distance and speed-dependent portions are separated from one another using known evaluation methods so that it is possible to determine distance d and relative speed v of each located object.

Moreover, it is possible, in general, to determine for each located object the azimuth angle of the located object based on the phase relations between the intermediate frequency signals of received signals by receiving antennas E1 through E8 and based on the phase relations between the intermediate frequency signals corresponding thereto. For this purpose, an angle estimation algorithm is implemented in evaluation unit 32 which, based on the phase relations for each object, calculates an angle estimation function (for example, maximum likelihood function), which specifies a probability distribution for the locating angle of the relevant object.

In a normal measuring cycle, the signals of all eight receiving antennas of array 20 are evaluated for this purpose on each frequency ramp. The larger the aperture of array 20 is, the greater is the achievable accuracy of the angle estimation.

A prerequisite for an undistorted angle estimation, however, is that the phase relations between the signals of the eight receiving antennas are not distorted during the course of the signal reception and of the signal evaluation. Since each of the two high-frequency components 10, 12 processes only four of the total of eight received signals, the two high-frequency components must be synchronized precisely with one another. For this purpose, the two high-frequency components are connected to one another by a synchronization line 38. On the one hand, the synchronization must result in the mixers, with which the received signals are mixed with in-phase transmit signal portions in the mixers of the two receiving units 18. If, for example, transmitting antenna S1 is active, the transmit signal generated in high-frequency component 10 may be transmitted for purposes of synchronization to high-frequency component 12, it being necessary to ensure that the signal propagation time during this transmission does not result in a phase offset. Alternatively, the mixers may also each receive one signal in receiving units 18 of the two high-frequency components, which is generated by local transmitting unit 16. In that case, however, the oscillators of the two transmitting units 16 must be synchronized with one another.

In general, any of the active electronic components may also cause a certain phase shift in the total of eight reception paths, so that phase differences may result between the reception paths, which distort the result of the angle estimation. These phase shifts, provided they are stable over time, may be measured already in the factory before the radar sensor is brought into operation and eliminated by suitable calibration measures or may be compensated for by corresponding corrections during the signal evaluation.

If, however, the operating conditions under which high-frequency components 10 and 12 operate are not stable during the operation of the radar sensor, then the phase differences may change over time, so that it is not possible to permanently eliminate measuring errors, even by an initial calibration of the radar sensor.

A major cause of temporal changes of the phase differences are temperature fluctuations, which influence the operating mode of the active electronic components in the two high-frequency components. Phase differences may then result on the one hand as a result of the two high-frequency components 10, 12 heating up to varying extents during operation. On the other hand, it is also possible that the electronic components in the two semiconductor components respond differently to temperature fluctuations.

In the case of stringent accuracy requirements, it is therefore necessary to check and, if necessary, to correct from time to time the phase calibration of receiving units 18 and also of transmitting units 16 of the two high-frequency components 10, 12 during operation.

One example method for such a recalibration of receiving units 18 is explained with reference to FIG. 2, which shows a simplified diagram of the radar sensor described above, and in which additionally for one single located radar target, whose radar echo is received at a particular azimuth angle θ, the phases φ of the signals received by receiving antennas E1 through E8 are plotted as a function of the location x of these receiving antennas (in the horizontal). In this case, it is assumed that any phase differences between the four reception paths in each receiving unit 18 are eliminated by an initial calibration, so that only phase differences between the reception paths in high-frequency component 10 on the one hand and the reception paths in high-frequency component 12 on the other hand are to be expected due to temperature fluctuations.

In the example considered here, receiving antennas E1 through E8 of array 20 are situated at equally spaced intervals in direction x. In the case of an oblique incidence of the radar echo at a particular azimuth angle, the phases of the signals received in the eight receiving antennas should, given a correct calibration, therefore be on a straight line as a function of location x, as is indicated in FIG. 2 by black dots and graph P1. The slope of these straight lines is a function of the angle of incidence of the radar echo. In the case of a vertical incidence (azimuth angle 0°), the straight line in FIG. 2 would extend horizontally. If due to different temperatures of high-frequency components 10, 12 and receiving units 18 contained therein, phase differences then result between the phases measured in the different receiving units, then this results in a phase offset Δφ between the phases in array 22 on the one hand and the phases in array 24 on the other hand, as is indicated in FIG. 2 by white dots and graph P2. The phase differences from antenna to antenna within each sub-array on the other hand remain unchanged. Based on this characteristic pattern, it is possible to establish and quantify the phase offset and to compensate for it by corresponding recalibration.

Figure 2:
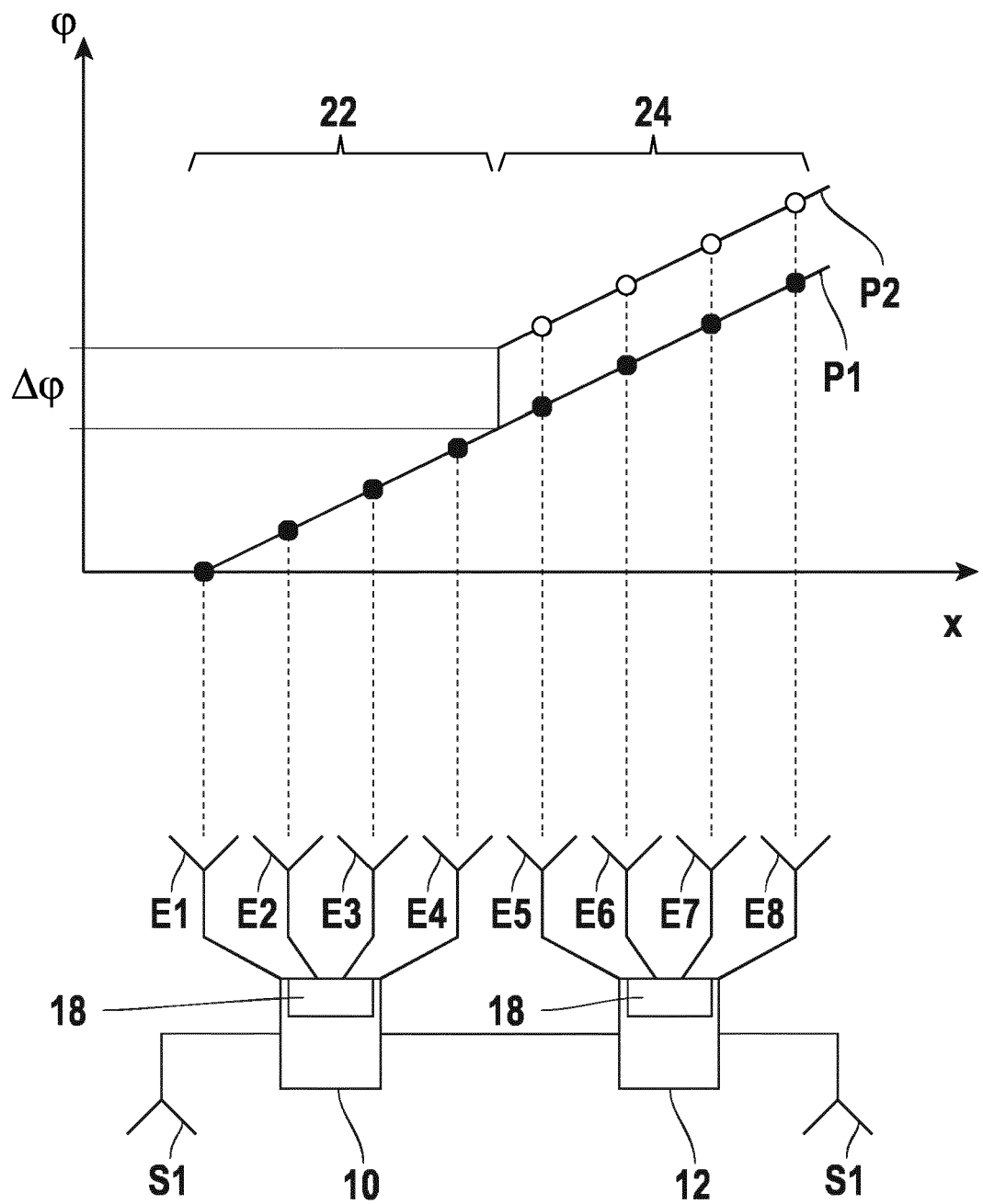
FIG. 2 shows a simplified diagram of the radar sensor for explaining an example method for the phase calibration of two receiving units in accordance with the present invention.

FIG. 2, however, illustrates the ideal case, in which the measured phases are not noisy and distorted by interference effects.

Interference effects occur, in particular, in a multi-target scenario, in which two or more radar targets are ordered simultaneously and the associated peaks in the spectrum of the intermediate frequency signal are so wide and/or are so close to one another that the peaks overlap and may no longer be separated. In such a case, the quality of the angle estimation function is significantly lower in a standard angle estimation based on all eight receiving signals than in a single-target scenario. The multi-target scenarios, which occur only relatively seldomly compared to the single-target scenarios, may therefore be identified based on the quality of the angle estimation function, so that they may be ruled out in the calculation of the phase offset.

The statistical noise may initially be suppressed by statistically evaluating the phases and phase differences for different pairings of receiving antennas. In FIG. 2, for example, it is possible based on the four measuring points for sub-array 22, to initially determine the course of the straight line (graph P1) that best matches the measured results, and to then extrapolate this straight line in sub-array 24, in order to determine the expected phases for receiving antennas E5 through E8 (black dots). These expected phases may then be compared for each receiving antenna with the actually measured phase (white dot), and a realistic value for the phase offset Δφ is obtained by averaging over the four differences obtained. This type of evaluation is analogously also possible in those cases in which the distances between the receiving antennas are not all identical.

The above-described evaluation may, in general, be carried out for each frequency ramp of the transmit signal. By statistically evaluating the results for multiple consecutive ramps (for example, by considering the median), it is then possible to further suppress the statistical fluctuation and to thus further improve the accuracy of the obtained value for phase offset Δφ.

Figure 3:
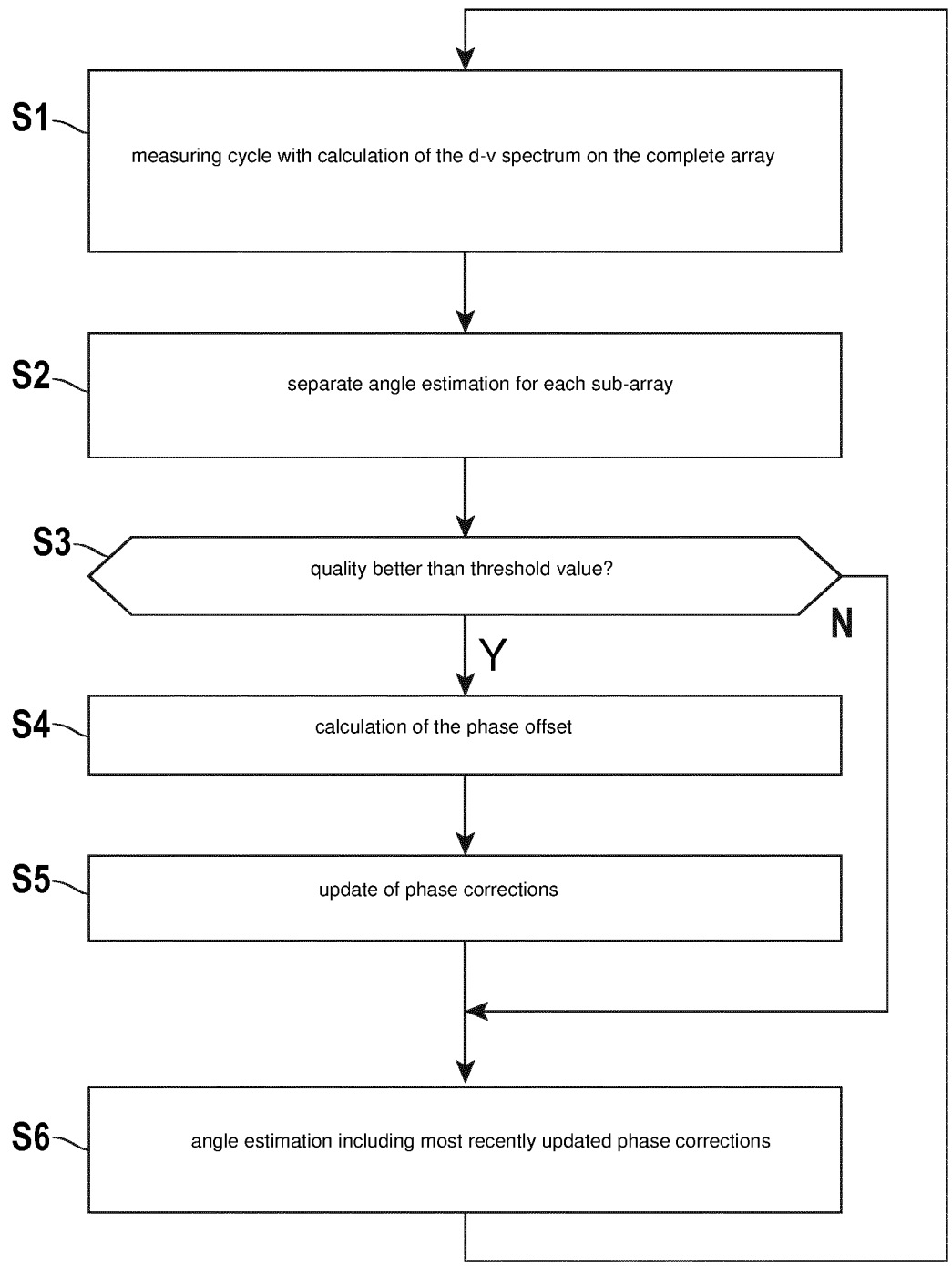
FIG. 3 shows a flow chart for explaining main steps of an example method according to the present invention.

FIG. 3 illustrates in a flow chart the main steps of an example method for calibrating receiving units 18 in accordance with the present invention.

In step S1, a "normal" measuring cycle is carried out in order to determine distances d and relative speeds v and, if necessary, also the locating angle of the located radar targets. The transmit signal generated in the measuring cycle may include a multitude of consecutive frequency ramps having the same slope and, where applicable, different center frequencies, and the calculation of the distances and relative speeds may be based on the totality of the signals received on these ramps. For the angle estimation, an evaluation of the signals on one or a few frequency ramps is, in general, sufficient, however, a preferably large volume of data will preferably be resorted to in order to improve the signal-to-noise ratio.

In step S2, separate angle estimations are carried out for the two sub-arrays 22, 24. In this case, one angle estimation function is calculated on the basis of the signals of receiving antennas E1 through E4 and an additional angle estimation function is calculated on the basis of the signals of receiving antennas E5 through E8. The results of these angle estimations should generally coincide even in the case of an erroneous calculation of the two receiving antennas 18, since the calibration error does not impact the phase differences between receiving antennas within the same sub-array. The selectivity of these angle estimations is limited, however, since the apertures of the sub-arrays used are each only half the aperture of entire array 20.

The quality is calculated for each of the two angle estimation functions, and in step S3 it is checked whether the quality for both angle estimation functions is above a particular threshold value. This threshold value is selected in such a way that a quality above this threshold value is normally only obtained in a single-target scenario, in which the received signals that result in a peak at a particular frequency in the spectrum of the intermediate frequency signal, originate only from one single reflection center, so that a clear phase offset is establishable between the signals received in the different sub-arrays.

If this condition is met (Y), phase offset Δφ is calculated in step S4 with the aid of the procedure explained with reference to FIG. 2, and in step S5, the phase calibration is corrected based on this phase offset.

The correction of the calibration could, in general, take place by activating active electronic components in one of the two receiving units in such a way that the signals processed in the reception paths are shifted in accordance with the phase offset. Preferably, however, the phase calibration takes place in a purely computational manner by subtracting phase offset Δφ of the phases for the signals from one of the two sub-arrays. This has the advantage that no additional active electronic components are required in the receiving units.

If in step S3 a multi-target scenario has been established (N), then steps S4 and S5 are skipped. In step S6, an angle estimation is then carried out on the basis of all eight received signals of complete array 20—both in a single-target scenario as well in a multi-target scenario, but now using the phase corrections that have been updated in step S5. A return to step S1 then takes place so that a next measuring cycle may be carried out.

In one modified specific embodiment, step S6 may also be integrated into step S1. In that case, the phase corrections updated in step S5 do not yet become active in the instantaneous measuring cycle, but only in step S1 of the subsequent measuring cycle.

In still another specific embodiment of the present invention, steps S2 through S5 are not carried out in each measuring cycle, but only at certain time intervals, which are greater than the duration of a single measuring cycle of typically 50 ms.

The radar sensor shown by way of example here in FIG. 1 is a MIMO radar sensor, in which the two transmitting units 16 operate, for example, in time division multiplexing, so that only one of the two transmitting antennas S1 and S2 is active at any point in time. This results in a virtual enlargement of the aperture of the antenna array and thus in a greater angle separability.

Figure 4:
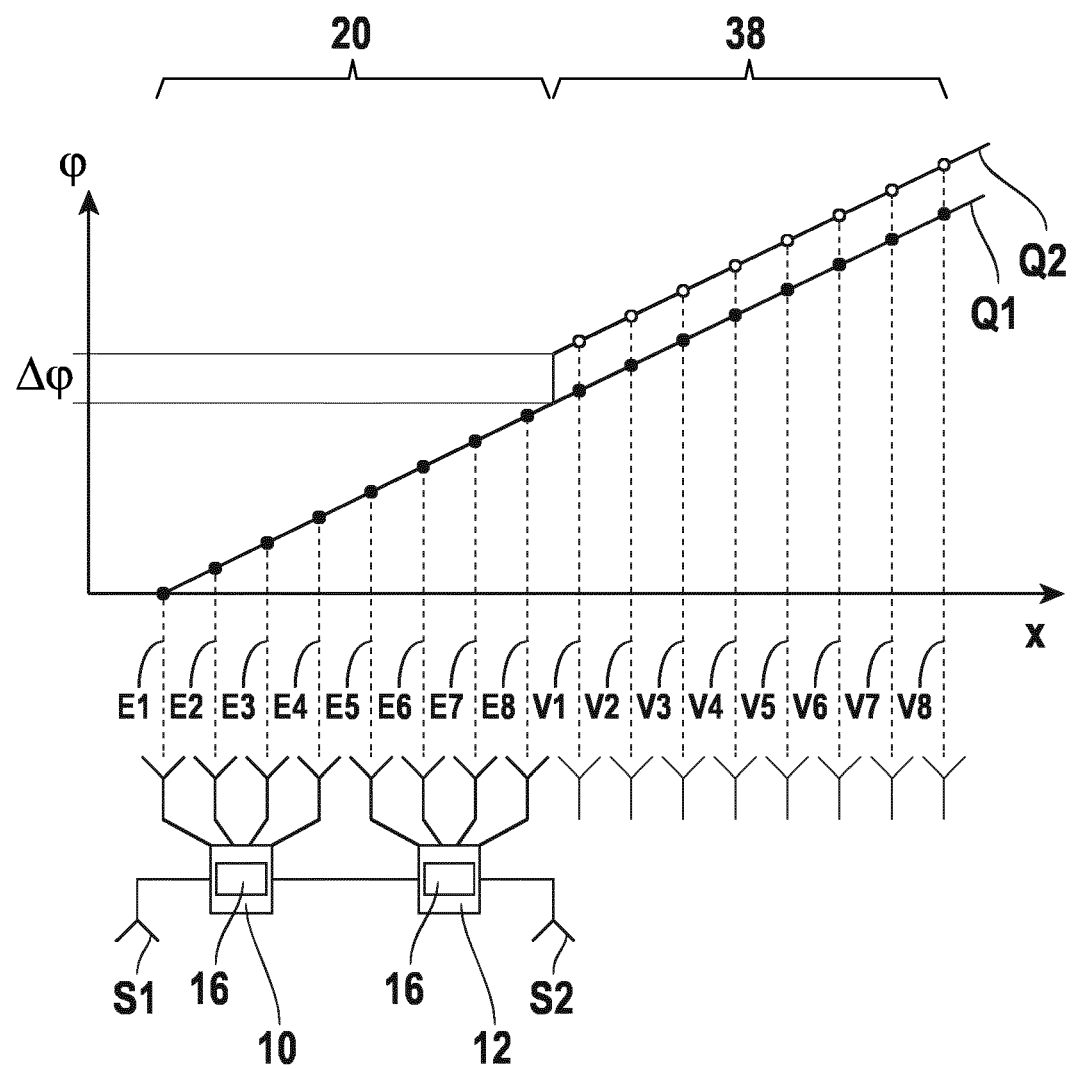
FIG. 4 shows a simplified diagram of the radar sensor according to FIG. 1 for explaining an example method for the phase calibration of two transmitting units in accordance with the present invention.

The phases of the signals received in receiving antennas E1 through E8 are a function of the total length of the signal path from transmitting antenna S1 or S2 currently transmitting the transmit signal, to the radar target and from the radar target back to the respective receiving antenna. These phases are therefore a function not only of the positions of receiving antennas E1 through E8 in x-direction, but also of the x-position of the transmitting antenna used at the moment. If, for example, transmitting antenna S2 is active, then the values, which are graphically illustrated in FIG. 4 for these receiving antennas, are obtained for the phases of the signals received in receiving antennas E1 through E8. If a switch is then made to transmitting antenna S1, this has the same effect on the phases of the received signals as if receiving antennas E1 through E8 had been shifted to the right (positive x-direction) by the distance between transmitting antennas S1 and S2. These shifted positions of the receiving antennas thus form a virtual array 38 including virtual receiving antennas V1 through V8.

The positions of transmitting antennas S1 and S2 are selected here in such a way that the distance between receiving antenna E8 and first virtual antenna V1 is the same as the distance between two adjacent receiving antennas. If the received signals in the active phases of transmitting antennas S1 and S2 are then considered together, then, given a correct calibration, the phases situated on the same straight line (graph Q1) as the phases for real array 20 are obtained for the signals in virtual antennas V1 through V8. If, however, a phase difference exists between the transmit signals generated by transmitting units 16 of the two high-frequency components, a corresponding phase offset Δφ for the phases results, which is received on the one hand in real array 20 and on the other hand in virtual array 38 (graph Q2 in FIG. 4). If an angle estimation is then carried out on the basis of combined arrays 20 and 26 in order to achieve an improved angle separation by doubling the aperture, the result of the angle estimation would then be distorted by phase offset Δφ.

However, this calibration error between transmitting units 16 may be corrected according to the same principle that was explained above in connection with FIGS. 2 and 3 for receiving units 18. If a single-target scenario has been established, phase offset Δφ is measured, and this phase offset is then used for a corresponding phase correction in the actual angle estimation.

What is claimed is:

1. A method for a radar sensor, the radar sensor including two receiving units, an array of receiving antennas formed of a first sub-array and a second sub-array, and an evaluation unit, the radar sensor being configured to carry out an angle estimation for located radar targets based on phase differences between signals received by the receiving antennas, each of the two receiving units including parallel reception paths for the signals of the receiving antennas of a respective one of the first and second sub-arrays, the method comprising the following steps:
   analyzing the received signals;
   determining, based on the analysis, whether a multi-target scenario or a single-target scenario is present; and
   in response to the determination being that the single-target scenario is present, performing a calibration by:
     measuring phases of the signals received via the sub-arrays;
     determining expected phases of the signals of the second sub-array based on a slope of the phases of the signals of the first sub-array;
     based on a difference between (a) the determined expected phases of the signals of the second sub-array and (b) the measured phases of the signals of the second sub-array, calculating a phase offset between the first sub-array as a whole and the second sub-array as a whole; and
     calibrating the phases in the two receiving units based on the calculated phase offset.

2. The method as recited in claim 1, wherein a quality of an angle estimation function is assessed for deciding whether the multi-target scenario or the single-target scenario is present.

3. The method as recited in claim 2, wherein separate angle estimation functions are formed for the two sub-arrays and a quality of each of the angle estimation functions is assessed for deciding whether the multi-target scenario or the single-target scenario is present.

4. The method as recited in claim 1, wherein the radar sensor is an FMCW radar sensor, and wherein a transmit signal is modulated in each measuring cycle according to a sequence of consecutive frequency ramps, in which multiple phase offsets are determined in each measuring cycle, in each case for one of the frequency ramps, and measured phase offsets are statistically evaluated to form a correction value for the calibration.

5. The method as recited in claim 1, wherein the calibration is carried out in each measuring cycle.

6. The method as recited in claim 5, wherein the angle estimation is carried out in each measuring cycle based on phase correction values that have been obtained in the same measuring cycle via the calibration.

7. A method for a radar sensor, the radar sensor including a real array of a number of receiving antennas, an evaluation unit designed to carry out an angle estimation for located radar targets based on phase differences between signals received by the receiving antennas, a first transmitting unit connected to and feeding a first transmitting antenna, and a second transmitting unit connected to and feeding a second transmitting antenna, the first and second transmitting antennas being physically offset from each other in a direction in which the receiving antennas of the real array are offset from one another, a combination of the two transmitting antennas and the real array forming a virtual array of twice the number of receiving antennas, a first half of the virtual array formed by the receiving antennas of the real array when the radar sensor transmits using the first transmitting antenna and a second half of the virtual array formed by the receiving antennas of the real array when the radar sensor transmits using the second transmitting antenna, the method comprising the following steps:

analyzing the received signals;

determining, based on the analysis, whether a multi-target scenario or a single-target scenario is present; and in response to the determination being that the single-target scenario is present, performing a calibration by:

measuring phases of the received signals via the first and second halves of the virtual array;

based on the measured phases, calculating a phase offset between the first half of the virtual array as a whole and the second half of the virtual array as a whole; and calibrating phases in the two transmitting units based on the calculated phase offset.

8. The method as recited in claim 7, wherein a quality of an angle estimation function is assessed for deciding whether the multi-target scenario or the single-target scenario is present.

9. The method as recited in claim 8, wherein separate angle estimation functions are calculated for the real array and for the virtual array and a quality of both of the angle estimation functions is assessed for deciding whether the multi-target scenario or the single-target scenario is present.

10. The method as recited in claim 7, wherein the radar sensor is an FMCW radar sensor, and wherein a transmit signal is modulated in each measuring cycle according to a sequence of consecutive frequency ramps, in which multiple phase offsets are determined in each measuring cycle, in each case for one of the frequency ramps, and measured phase offsets are statistically evaluated to form a correction value for the calibration.

11. The method as recited in claim 7, wherein the calibration is carried out in each measuring cycle.

12. The method as recited in claim 11, wherein the angle estimation is carried out in each measuring cycle based on phase correction values that have been obtained in the same measuring cycle via the calibration.

13. The method as recited in claim 7, wherein the physical offset is such that, after modifying the signals according to the calibration, a distance between (a) a nearest signal phase of the second half of the virtual array to the signal phases of the first half of the virtual array and (b) a nearest signal phase of the first half of the virtual array to the signal phases of the second half of the virtual array is approximately equal to a distance an adjacent pair of the signal phases of the first half of the virtual array.

14. The method as recited in claim 7, further comprising:
determining expected phases of the signals of the second half of the virtual array based on a slope of the phases of the signals of the first half of the virtual array, wherein the phase offset is calculated based on a difference between (a) the determined expected phases of the signals of the second half of the virtual array and (b) the measured phases of the signals of the second half of the virtual array.

15. The method as recited in claim 7, wherein:
the first transmitting unit is arranged on a first physical integrated circuit on which a first receiving unit is arranged;

the second transmitting unit is arranged on a second physical integrated circuit on which a second receiving unit is arranged;

a first subset of the receiving antennas of the real array is physically connected to the first receiving unit and not the second receiving unit; and a second subset of the receiving antennas of the real array is physically connected to the second receiving unit and not the first receiving unit.

16. A radar sensor comprising:
two receiving units;
an array of receiving antennas formed of a first sub-array and a second sub-array;
an evaluation unit configured to carry out an angle estimation for located radar targets based on phase differences between signals received by the receiving antennas; and
a control unit configured to control functions of the radar sensor;
wherein each of the receiving units includes parallel reception paths for signals of the receiving antennas of a respective one of the first and second sub-arrays; and
wherein the control unit is configured to:
analyze the received signals;
determine, based on the analysis, whether a multi-target scenario or a single-target scenario is present;
in response to the determination being that the single-target scenario is present, perform a calibration by:
measuring phases of the signals received via the sub-arrays;
determining expected phases of the signals of the second sub-array based on a slope of the phases of the signals of the first sub-array;
based on a difference between (a) the determined expected phases of the signals of the second sub-array and (b) the measured phases of the signals of the second sub-array, calculating a phase offset between the first sub-array as a whole and the second sub-array as a whole; and
calibrating the phases in the two receiving units based on the calculated phase offset.

17. A radar sensor comprising:
a first transmitting unit connected to and feeding a first transmitting antenna;
a second transmitting unit connected to and feeding a second transmitting antenna;
a real array of a number of receiving antennas;
an evaluation unit configured to carry out an angle estimation for located radar targets based on phase differences between signals received by the receiving antennas; and
a control unit configured to control functions of the radar sensor;
wherein:
the first and second transmitting antennas are physically offset from each other in a direction in which the receiving antennas of the real array are offset from one another;
a combination of the two transmitting antennas and the real array forms a virtual array of twice the number of receiving antennas, a first half of the virtual array being formed by the receiving antennas of the real array when the radar sensor transmits using the first transmitting antenna and a second half of the virtual array being formed by the receiving antennas of the real array when the radar sensor transmits using the second transmitting antenna; and the control unit is configured to:
    analyze the received signals;
    determine, based on the analysis, whether a multi-target scenario or a single-target scenario is present; and
    in response to the determination being that the single-target scenario is present, perform a calibration by:
        measuring phases of the received signals via the first and second halves of the virtual array;
        based on the measured phases, calculating a phase offset between the first half of the virtual array as a whole and the second half of the virtual array as a whole; and
        calibrating phases in the two transmitting units based on the calculated phase offset.

* * * * *